Inventor
Hans Werner Paehr

United States Patent Office 3,520,788
Patented July 14, 1970

3,520,788
PROCESS FOR THE EXTENSION OF THE EFFECTIVE SURFACE OF ALUMINIUM ELECTRODES OR FOILS FOR ELECTROLYTIC CAPACITORS
Hans Werner Paehr, 20 Niddastr.,
638 Bad Homburg, Germany
Filed Jan. 13, 1967, Ser. No. 609,231
Claims priority, application Germany, Jan. 21, 1966,
P 38,594
Int. Cl. C23b 3/04
U.S. Cl. 204—141                            9 Claims

ABSTRACT OF THE DISCLOSURE

A process for increasing the effective surface of aluminium electrodes or foils by electrolytic etching, comprising the steps of supplying an etching current by applying a DC voltage of from about 5 to 10 volts with positive polarity to at least one aluminium electrode to be electrolytically etched and a negative polarity to at least one counter electrode lying in a halogen salt bath, and adding onto said supplied DC voltage, pulses having an opposite polarity, and having a half-width of approximately 10% of their period, and their flank steepness being a maximum of about 15% of the half-width of the pulses and having a frequency of about from 10–100 c.p.s. and such an amplitude that the aluminium electrode assumes a potential of about −.8 to −1.8 volts, the etching current being completely interrupted for a short period of time.

---

The present invention relates to a process for the extension of the effective surface of aluminum electrodes or foils for electrolytic capacitors. It is one object of the present invention to provide a process for the anodic corrosion of aluminium electrodes or aluminium foils for electrolytic capacitors by means of pulse superimposed direct current.

Processes of this type are already known in which a unipolar current pulsing above a minimum value having a pulse value of 50 to 250% or below 50%, respectively, has been used. With these processes, therefore, current pulses of the same polarity are superimposed on direct currents. Tests with these processes have shown that the pulse rate has to be regarded as being only one of a number of parameters which are decisive for corrosion, such as current density, electrolyte concentration and electrolyte temperature, and that, by means of a unipolar current pulsing above a minimum value, corrosion qualities will only be obtained which, by suitable selection of the other parameters, may even be obtained by means of pure or technical direct current respectively. In addition, the alternative current processes already known have also been tested in which the current in the corrosion bath is periodically reversing. With the latter processes minor capacity yields have been obtained compared with direct current.

The present invention relates to a process for the extension of the effective surface of aluminium electrodes or foils for electrolytic capacitors by anodic corrosion in a bath containing an electrolyte and counter electrodes by means of a direct current superimposed by current pulses, characterised in that the current pulses are of such polarity and size as to periodically interrupt corrosion for a short period of time.

For this purpose negative pulses are admitted to the electrode to be corroded and/or positive pulses to the counter electrodes. This corrosion method will not be influenced by the undulation of the anodic corrosion voltage. It will, therefore, not be necessary to screen the current to be supplied by technical rotary current rectifiers.

With this and other objects in view which will become apparent in the following detailed description, the present invention will be clearly understood in connection with the detailed description and the accompanying drawings, in which.

Figure 1A:
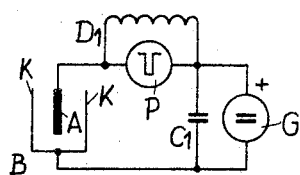
FIGS. 1a and 1b are circuit diagrams having the elements of the circuit in series and in parallel, respectively.
Figure 1B:
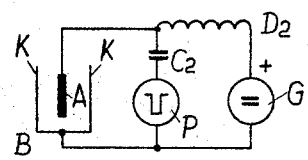

Referring now to the drawing, and in particular to FIGS. 1a and 1b, a corrosion bath B containing the electrode to be corroded A and counter electrodes K, a pulse source P and a direct current source G are connected in series, see FIG. 1a, and in parallel, see FIG. 1b. In FIG. 1a, the choke D1 and the capacitor C1 are bridging the pulse source P or the direct current source G, respectively, so that both current sources will be effective with respect to the corrosion bath B without any reduction. Vice versa, in FIG. 1b, a capacitor C2 and a choke D2 are responsible for the fact that sources P and G will not short-circuit each other. If the internal resistances of P and G have already corresponding properties, the elements C1 or C2 and D1 or D2, respectively, may be omitted. In particular with technical plants of a major scale inductivities of the feed lines to the current source G are frequently sufficiently great so that the choke D2 in FIG. 2b will not be required. In case the pulse source P in FIG. 1b has been provided with transistors, C2 may be omitted, and the direct current source G may serve as supply source for the transistors. The pulse source should have a high internal resistance $Ri$ which, with the inductivity $Ls$ of the supply lines which cannot be avoided, will form an as small time constant $Ls/Ri$ as possible, so that the pulses will arrive at the corrosion bath without any reduction and distortion.

Further details of the arrangements will not be discussed, it will merely be observed that any direct current and pulse sources which are already known may be used if they are of sufficient capacity.

Figure 2:
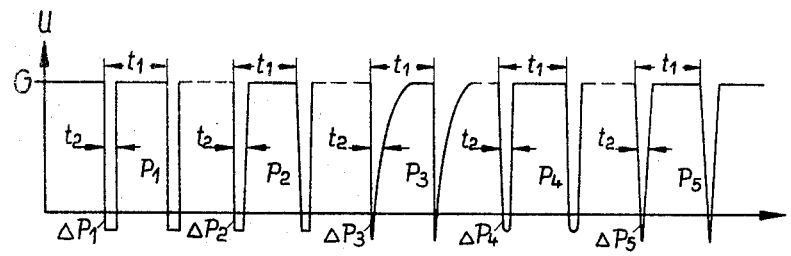
FIG. 2 is a diagram depicting the relation between the total voltage and the time.

Examples for the total voltage U lying over the corrosion bath depending upon the time $t$ have been shown in FIG. 2. The voltage U consists of a direct voltage G and a pulse voltage P1, P2, P3, P4 or P5 which has a period $t1$ and a pulse period based upon the half width value $t2$. The amplitude of the pulses is preferably greater than the direct voltage, so that during the pulse maximum a negative current in the amount ΔP will be lying over the bath. All types of pulses shown in FIG. 2 are suitable for an embodiment according to the present invention. However, rectangular pulses such as P1 or trapezoid pulses such as P2 are most suitable in this case, especially so if they have steep flanks the ascent and descent times of which will be smaller than 15% of the pulse duration.

In tests, pulse frequencies from 10 to 100 cycles have been used, i.e. pulse periods amounted to 10 to 100 msecs. In all cases a pulse duration which was smaller than 10% of the pulse period has been employed. Pulse durations of less than 1.5 msec. may be used. The corrosion direct voltage was between 5 and 10 volts. Under these circumstances an optimum effect has been obtained in any case if the pulses were of such height that the voltage at the electrode to be corroded, as compared to the voltage at the counter electrode during the pulse maximum, was more negative by an amount corresponding to 8 to 33% of the corrosion direct voltage, and if the corrosion current during this time was zero or slightly negative. Optimum dimensioning of the pulse frequency, pulse duration and pulse height depends, apart from pulse shape, upon many factors, especially also upon resistance and inductivity of the foil, the corrosion bath and the supply lines. Electrolytes employed may comprise, for example, haloid acids and/or salts thereof. Following is a practical example.

In a standing bath a series of 0.1 mm. strong high purity aluminium foils has been corroded and subsequently formed at 400 volts in the presence of the following conditions, the purity being about 99.99%:

Electrolyte—aqueous solution containing 3% sodium chloride
Temperature—70° C.
Corrosion time—130 secs.
Direct current density—0.6 A./cm.$^2$
Direct voltage—5.2 volts
Pulse shape—rectangular
Pulse frequency—40 cycles
Pulse width—app. 1 msec.
Pulse height—variable between 4.6 and 7.6 volts
ΔP (see FIG. 2)—variable between +0.6 and −2.4 volts.

Figure 3:
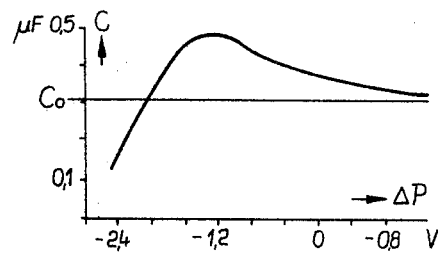
FIG. 3 is a diagram depicting the relation between the capacity and a variable of the voltage.

In FIG. 3 the capacity C of 1 cm.$^2$ foil has been shown in relation to ΔP. Co is the capacity obtained with direct current corrosion under otherwise identical conditions. Maximum capacity C, in this case, is obtained at ΔP=−1.2 volts amounting to 1.55 times the direct current value Co. But, even at ΔP values of −1.7 and −0.4 volts, an increase in capacity of 30% is achieved by pulsation. Even at positive ΔP values improvement obtainable still amounts to 10–20%. At ΔP=−2 volts capacity considerably decreases, obviously due to the fact that increasing current reversal occurs which is driving Na-ions into the corroded pores.

Figure 4:
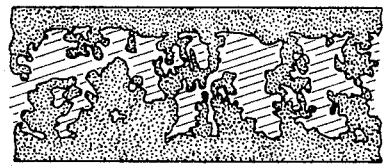
FIG. 4 is an enlarged sectional view of a foil produced in accordance with the present invention.

Corroded foils obtained in the process according to the present invention have extremely high capacity yields and a high porosity. Even the structure of the channels corroded into the foil is remarkable: the width of these channels is small as compared to their depth. It will therefore be possible, without effecting complete destruction of the foil, to obtain a far more intense depth corrosion than with the corrosion processes which are already known so far, in which deepening of the corrosion channels has always been connected with widening of the same. FIG. 4 is a 1:300 enlarged sectional view of a foil produced according to the present invention.

On the reaction in the corrosion bath the following ideas have been developed which are suitable as a working hypothesis but which may not be deemed as being absolutely true.

During the corrosion process the foil is, due to the pulses, periodically depolarized for a short period of time so that gas bubbles which are maintained in the corrosion pores under high electrostatic pressure, will escape and at the same time expel the electrolyte and the decomposition products arising during corrosion from the pores. The decrease in voltage effected by the pulses must be a sudden one so that expansion of the gases occurs explosively, and the pulse duration must be short so that the electrolyte when reentering the corrosion channels is already again under the effect of the corrosion voltage. Obviously, this is a pump effect which periodically drives fresh electrolyte into the corrosion channels.

A further effect of the pulses is due to the fact that the foil is capactively deloaded by them. In the following this will be discussed in detail.

The depth effect with anodic direct current corrosion results from the fact that in those areas which are not attacked by the electrolyte hydroxide layers will be established the surfaces of which are capacitatively loaded so that the corrosion ions are deflected from these areas and routed towards the corrosion channels already existing. This effect, however, results at the same time in the fact that, with direct current corrosion, after a certain period of time, any new corrosion pores will no longer occur, but that the old ones will only be further opened. Loaded hydroxide layers may even occur in the corrosion process according to the present invention, but they will periodically be deloaded by the pulses so that between pulses corrosion ions may arrive at the layers and decompose the same.

In this way, an increase in corrosion channels is resulting.

Also the size of ΔP required for obtaining a high degree of roughening, i.e. of the negative surplus of the pulses with respect to the direct current, can theoretically be explained: Since, in the process according to the present invention, it is decisive to completely cut off the corrosion current during the pulse duration, the tendency of aluminium to be decomposed in the electrolyte without exterior voltage, must be compensated. For this end, ΔP is made equal to the polarization voltage of aluminium with respect to the electrolyte.

The present invention does not only relate to the examples, arrangements and rates shown, but it refers to any and all methods and equipment which are based upon the principal idea of interrupting periodically and for a short period of time a corrosion process for obtaining electrodes having a high degree of roughening as well as a high porosity. Instead of applying negative going pulses to the aluminum electrode to be etched, positive going pulses may be applied to the counter-electrode.

I claim:
1. A process for increasing the effective surface of aluminum electrodes or foils by electrolytic etching, comprising the steps of
    supplying an etching current by applying a D.C. voltage of from about 5 to 10 volts with positive polarity to at least one aluminum electrode to be electrolytically etched and a negative polarity to at least one counter-electrode lying in a halogen salt bath, and
    adding onto said supplied D.C. voltage, pulses having an opposite polarity and having a half-width of approximately 10% of their period, and their flank steepness less than about 15% of the half-width of the pulses and having a frequency of about from 10–100 c.p.s. and such an amplitude that the aluminum electrode assumes a potential of about −0.8 to −1.8 volts relative to the potential of the counter-electrode, the etching current being completely interrupted for a short period of time.
2. The process, as set forth in claim 1, wherein said voltage pulses are supplied to said electrode to be etched and are negative voltage pulses.
3. The process, as set forth in claim 1, wherein said voltage pulses are supplied to said counter electrode and are positive voltage pulses.
4. The process, as set forth in claim 1, wherein said voltage pulses are rectangular pulses or trapezoid pulses.
5. The process, as set forth in claim 1, wherein the frequency of said pulses is 40 cycles and the duration of said pulses is less than 1.5 msecs.
6. The process, as set forth in claim 1, wherein said voltage pulses are of such height that the voltage at said electrode to be etched as compared to that at said counter electrode during the maximum of said pulses is more negative by an amount corresponding to 8 to 35% of said D.C. voltage.
7. The process, as set forth in claim 1, wherein said voltage pulses are of such height that the balances of said voltage between said aluminum electrodes to be corroded and said counter and said counter elec- trodes are equal with the polarization voltage of aluminum with respect to said electrolyte.

8. The process, as set forth in claim 1, wherein said corrosion is effected in aqueous solutions of a material selected from the group consisting of haloid acids and salts thereof.

9. The process, as set forth in claim 1, wherein said corrosion is effetced in an aqueous solution containing 3% sodium chloride at a temperature of 70° C. utilizing a direct current density, based upon the surface of said electrodes or foils, of 0.6 A./cm.$^2$.

References Cited

UNITED STATES PATENTS

| | | | |
|---|---|---|---|
| 3,297,555 | 1/1967 | Rerat | 204—141 |
| 3,249,523 | 5/1966 | Post et al. | 204—141 |
| 3,193,485 | 7/1965 | Vincent | 204—141 |
| 3,085,950 | 4/1963 | Thomas et al. | 204—141 |
| 2,930,741 | 3/1960 | Burger et al. | 204—141 |

JOHN H. MACK, Primary Examiner

S. S. KANTER, Assistant Examiner